July 26, 1966 R. B. FALK 3,262,812
MAGNETIC RECORDING TAPE WITH MAGNETIC LAYER OF OXIDE COATED IRON-COBALT ALLOY PARTICLES IN A BINDER
Filed March 26, 1964
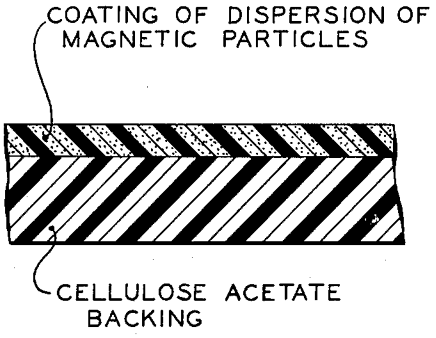
INVENTOR
RICHARD B. FALK
BY Harold J. Holt
ATTORNEY 3,262,812
Patented July 26, 1966

3,262,812

MAGNETIC RECORDING TAPE WITH MAGNETIC LAYER OF OXIDE COATED IRON-COBALT ALLOY PARTICLES IN A BINDER

Richard B. Falk, Greenville, Mich., assignor to General Electric Company, a corporation of New York Filed Mar. 26, 1964, Ser. No. 355,103
6 Claims. (Cl. 117—160)

This application is a continuation-in-part of my co-pending application S.N. 69,810, filed November 17, 1960, now U.S. Patent 3,156,650.

This invention relates to a magnetic recording medium and more specifically to a magnetic recording medium containing oxidized fine particles of iron and cobalt.

My application S.N. 69,810 is directed to a new form of magnetic material of outstanding magnetic properties including high saturation magnetization and high coercive force. The magnetic material is composed of single domain particles, each of which has a core of an alloy of iron and cobalt surrounded by a coating of an oxide of iron and cobalt. The particles are prepared by electrolytically depositing iron-cobalt particles into a liquid metal cathode and then oxidizing the particles.

It has now been found that a magnetic recording medium may be prepared utilizing fine particles of oxidized iron and cobalt which combines outstanding magnetic qualities with a high level of coercive force. The magnetic recording media so prepared have been found to possess higher remanent induction and thus may be used with a substantially thinner layer than any comparable recording media heretofore known made with magnetic particles. A process for preparing such particles has also been discovered, which enables particles of tailorable coercive force to be produced.

The single figure of the drawing illustrates in cross section a magnetic recording tape of the invention.

In general, the magnetic recording medium of the invention comprises a non-magnetic support and fine magnetic particles supported thereon, each of the particles having a core of an alloy of iron and cobalt and a coating surrounding the core of an oxide of iron and cobalt. The particles may have from about 10 to 80 percent cobalt based on the weight of the iron and cobalt before oxidation with optimum proportions of cobalt being from about thirty to fifty-five percent. The magnetic particles of the invention are of approximately single domain size, having an average particle diameter or transverse dimension of less than 1000 angstroms and preferably from about 200 to 700 angstroms. Iron oxide particles conventionally used in magnetic recording media are about ½ to 1 micron (5000 to 10,000 angstroms) in size, or roughly 10 to 20 times the average size of the present particles. Because of the smaller size and higher induction of the present particles, it is possible to produce recording media which are thinner and have greater storage density per unit area. Moreover, because the particles are prepared electrolytically, the particles possess great uniformity in particle-to-particle size and magnetic properties. Such uniformity has long been recognized as important in controlling the noise level in recording media.

In addition, the intrinsic coercive force of the particles may be tailored to a desired high level of coercivity without sacrifice of the high remanent induction and with substantially no sacrifice of the directionality of the particles. Existing magnetic tapes possess coercive forces of the order of 250–350 oersteds, while the iron-cobalt oxide particles of my aforementioned application S.N. 69,810 possess coercive forces of over 1800 oersteds. While a high level of coercive force is generally considered a desirable property in magnetic recording media, the coercive force of the aforementioned particles is of such magnitude that they would present problems of both saturation and signal erasure with existing recording equipment. The intrinsic coercive force of these particles may be varied from about 350, and preferably 500, to in excess of 1800 oersteds as measured at room temperature. The higher coercive forces available make the present recording media particularly useful for permanent storage of information. In particular, the present recording media may be used as a master to record by contact onto other recording media containing conventional gamma iron oxide particles of lower coercive force.

The invention will be described with particular reference to magnetic recording tape. However, it should be understood that other magnetic recording media, as for example, magnetic ink, magnetic ink transfer ribbons, magnetic discs, drums and belts, all of which comprise, or are used in the form of, a non-magnetic support having a magnetic coating adhered thereto, or magnetic particles carried therein, are within the scope of the present invention. The term "magnetic recording medium" as used herein in both the specification and claims should accordingly be construed to include all such embodiments.

The oxidized fine magnetic particles are prepared by electrolytically depositing the particles into a liquid metal cathode, usually mercury, from an electrolyte comprising iron and cobalt ions. The particles at this point are highly elongated and dendritic in structure. During deposition, the interface between cathode and electrolyte is maintained in a quiescent state. The electrodeposited particles, while still in the mercury, are then aged at an elevated temperature until the intrinsic coercive force is reduced to the desired level. For presently used recording equipment, this level may range from 350 to as high as 2000 oersteds but will ordinarily be about 500 to 1800 oersteds as measured at room temperature. The present particles may be prepared with coercive forces spanning this entire range. The thermal aging step initially increases the coercive force of the particles by eliminating the dentritic branches which are formed in the electrodeposition step. As the aging process proceeds, the initially elongated particles increase in diameter and diminish in length by a thermal growth process in the liquid mercury phase. This lowers the coercive force of the particles to the desired level of coercivity. After aging, the particles are oxidized to form a coating on each particle of an oxide of iron and cobalt. The oxidized particles are then dried of any residual mercury, dispersed in a binder and milled. The particle-binder mixture is then adhered to a suitable non-magnetic support.

The electrolyte used for electrodeposition of the iron-cobalt particles may consist of the soluble bivalent salts of iron and cobalt, suitable examples of which are iron and cobalt sulfates or chlorides. The pH of the electrolyte should be made acidic with, for example, sulfuric or hydrochloric acid, and a preferred pH is approximately 2. The anode may either be a consumable anode, such as pure iron or pure cobalt, or a cobalt-iron alloy, or it may be a non-consumable anode of an inert material such as platinum, lead or graphite. The cathode is a liquid metal, preferably mercury.

The current density may be varied over a wide range. Current densities varying from 3 amps/sq. ft. to 80 amps/sq. ft. have been found to produce particles having a coercive force in their compacted state in excess of 1500 oersteds. Ordinarily, the higher the current density, the shorter the time of deposition. A current density of 10 to 20 amps/sq. ft. for 200 to 480 minutes has been found to produce optimum magnetic properties, although acceptable results have been achieved over a wide range of current densities and times.

After deposition, the particles are thermally aged by heat-treating in the mercury cathode for a period of time ranging from 1 hour to 70 hours at a temperature of about 200° to 300° C. During this step, the initially elongated iron-cobalt-oxide particles become progressively rounder and this consequently results in a lowering of the directionality as well as the coercive force of the particles. However, and surprisingly, it has been found that the directionality may be recovered in a later processing step. Moreover, the rounder, non-elongated particles have been found to possess higher saturation magnetization (induction) than elongated particles. The higher induction is belived to result from the fact that the rounder particles have a substantially larger diameter than the elongated particles, thus possessing a higher ratio of metallic core to oxide shell. This is due to the fact that the thickness of the oxide shell is independent of particle size or geometry. Consequently, as the particle diameter increases, the proportion of the metallic phase increases. As used herein, particles are considered elongated where at least half the particles have length to diameter ratios of at least 2 to 1 and non-elongated where at least half the particles have a length to diameter ratio of less than 2 to 1.

During the aging process, the coercive force of the particles decreases as a function of aging time and temperature. The following Table I illustrates the change in particle diameter in angstroms, intrinsic coercive force (H*ci*) and directionality (*Br/Bis*) in the mercury phase and after removal by oxidation, as a function of aging time at 200° C. Approximately 2.5 pounds of electroplated particles in 50 pounds of mercury were aged in a ventilated steel container. The ratio of residual induction to saturation induction (*Br/Bis*) represents the directionality or alignment of the particles. A ratio of 1.00 represents theoretically perfect alignment.

TABLE I

| Aging Time (Minutes) | Average Particle Diameter (Angstroms) | Properties in Mercury (Meas. at −196° C.) | | Properties of Oxide (Meas. at R. T.) | |
|---|---|---|---|---|---|
| | | Hci (Oersteds) | Br/Bis | Hci (Oersteds) | Br/Bis |
| 20 | 180 | 1,520 | 0.870 | 1,955 | 0.860 |
| 40 | 206 | 1,440 | 0.847 | 1,860 | 0.846 |
| 80 | 221 | 1,375 | 0.816 | 1,745 | 0.817 |
| 160 | 249 | 1,320 | 0.770 | 1,575 | 0.742 |
| 320 | 312 | 1,210 | 0.711 | 1,390 | 0.712 |
| 520 | 360 | 1,100 | 0.660 | 1,175 | 0.654 |
| 1,040 | 477 | 840 | 0.542 | 910 | 0.557 |
| 3,000 | 518 | 650 | 0.445 | 700 | 0.404 |
| 4,200 | 650 | 520 | 0.366 | 690 | 0.384 |

It can be seen from the above data that a considerable variation in coercive force level is obtainable in mercury-free oxide coated particles. If the aging time were continued, the coercive force would, of course, decrease further. Thus, a specific aging time can be selected to obtain a predetermined coercive force level in the particles. It should be noted that as the coercive force diminishes, the diameter of the individual particles increases. The particle diameters were measured by electron photomicrographs of the individual particles in which it was also noted that as the diameter of the particles increased, the average length to diameter ratio of the particles went from nearly five to almost one. The table shows that the alignment of the particles also decreases with increasing aging time. However, as will be pointed out below, this loss of alignment may be recovered by properly dispersing the particles.

It may in certain instances be desirable to electrodeposit non-elongated, rather than elongated, particles. This can be accomplished by agitating the mercury at the electrolyte interface during deposition. The remaining process steps would be essentially the same as described for particles initially deposited in elongated form. However, the thermal aging step would serve initially to increase the coercive force as the particles grew following which the coercive force would decrease as the particles continued to grow during aging beyond a critical diameter. In either case, the aging step serves to alter the coercive force of the particles to the desired level of coercivity.

After aging, the particles are oxidized by exposing them to an atmosphere of moist air or by contacting them with a chemical oxidizing agent, as more fully disclosed in my aforementioned parent application S.N. 69,810. The residual mercury is then removed from the particles by vacuum distillation or mechanically, by flotation.

Both electron diffraction and X-ray analysis substantiate the presence of two phases in the oxidized particles—a ferromagnetic core composed of a solid solution of iron and cobalt and a ferromagnetic shell composed of an iron-cobalt spinel oxide. The oxygen content of the particles will vary from a few percent up to 10 or even 15% by weight of the total weight of the particles. In view of the fact that in their preferred form the particles are essentially non-elongated, the particles will ordinarily possess relatively larger proportions of unoxidized core than the particles described in my aforementioned parent application S.N. 69,810. Thus the oxygen content, based on the total weight of the particles, will range from as low as 1 or 2% to as high as 15%, the latter being the upper limit set forth in my aforementioned parent application.

After oxidation, the dried particles are subjected to a grinding or milling operation, preferably while dispersed in the binder and solvent used for adhering the particles to a non-magnetic support. As noted in Table I above, the *Br/Bis* ratio, or alignment of the particles decreases with increasing aging time. It is believed that this results from an agglomeration of the round particles. Milling of the powder serves to break up the agglomerated round particles which then act as single particles. Electron photomicrographs show that virtually no change occurs in particle dimensions during the milling operation. The particles may then be oriented or aligned in the solvent-binder dispersion. The following Table II illustrates the progressive recovery of *Br/Bis* ratio with milling time. The *Br/Bis* ratios were determined after orienting the particles in a 2500 gauss D.-C. field. The particles had previously been thermally aged while in mercury for approximately 3000 minutes. The coercive force of the particles after the various milling times is also given.

TABLE II

| Milling Time (Hours) | Br/Bis at −196° C. | Hci (Oersteds) at −196° C. |
|---|---|---|
| 0 | 0.540 | 775 |
| 24 | 0.683 | 775 |
| 48 | 0.698 | 740 |
| 72 | 0.721 | 750 |
| 88 | 0.733 | 725 |
| 160 | 0.756 | 725 |
| 184 | 0.766 | 700 |

Thus, the round, lower coercive force particles can be aligned if they are adequately dispersed.

Following the milling step, the particle-binder dispersion is applied, by conventional techniques, to a non-magnetic support or sheet and formed into a magnetic tape or other recording media.

The following example illustrates the preparation of the fine particle iron-cobalt-oxide magnetic material.

*Example 1*

Iron-cobalt particles were electrodeposited into a mercury cathode using an electrolyte of ferrous and cobaltous sulfate containing about 36 percent cobaltous sulfate and 64 percent ferrous sulfate. The anode was an alloy containing 60 percent iron and 40 percent cobalt. The electrolyte had a pH of 2.2 ±0.2 and a molarity of 1.6. The deposition temperature was 25° C. ±5° C. Using a current density of 15 amps/sq. ft., electrodeposition proceeded for 200 minutes while a quiescent interface was maintained between cathode and electrolyte. The resulting particle-mercury slurry contained about 96 percent mercury and 4 percent iron-cobalt fine particles, of which 64 percent was iron, remainder cobalt.

Two hundred pounds of this slurry were then thermally aged, by heat-treating at a temperature of 200° C. until an intrinsic coercive force of 720 oersteds, as measured at −196° C., was obtained. The alignment of the particles as measured by the *Br/Bis* ratio was 0.523. Heat-treating time was about 30 hours.

The particle-mercury mixture, after being concentrated magnetically to remove some of the mercury, was placed in an A.-C. field of 3400 gauss for 10 seconds and was then oxidized by placing it in a closed container with a fresh air intake and outlet. Air was bubbled through water before passing into the air intake to increase the humidity. The moist air was passed through the container for 100 hours at 28° C., the relative humidity being 85 percent. Oxidized particles, floated to the surface of the mercury, were removed and were then dried of residual mercury by vacuum distillation for 240 minutes at 300° C. at a pressure of about 150 microns. While the powder was in the distillation chamber under partial vacuum, it was covered, after cooling, with toluene. The toluene solvent was removed by drying for 48 hours in the air at room temperature. The particles had an intrinsic coercive force of 725 oersteds and a *Br/Bis* ratio of 0.52, both as measured at room temperature. A chemical analysis indicated that the particles had the following composition by weight percent: cobalt—36.04; iron—57.6; mercury—1.34; oxygen—4.66 and traces of copper and nickel.

The thus prepared fine magnetic particles of iron-cobalt-oxide are applied as a dispersion to a non-magnetic support of a wide variety of well-known film-forming resins, elastomers, papers or other backing materials. Suitable examples of such materials are polyesters (principally polyethylene glycol terephthalate), cellulose esters and ethers, vinyl chloride, acrylate and styrene polymers and copolymers, polyurethanes, polyamides, aromatic polycarbonates as, for example, those produced from 2,2-bis-(4-hydroxyphenyl)-propane and polyphenyl ethers as, for example, those produced by oxidative coupling of 2,6 dimethyl phenol. The binder for the magnetic particles may be one or more of the aforementioned synthetic resins or elastomers with or without plasticizers or other modifiers. A wide variety of solvents may be used for forming a dispersion of the fine particles and binders. Organic solvents, such as ethyl, butyl and amyl acetate, isopropyl alcohol, dioxane, acetone, methylisobutyl ketone and toluene are frequently used for this purpose. The particle dispersion may be applied to the backing film by roller coating, gravure coating, knife coating, extrusion or spraying of the mix onto the backing or by other known methods. The specific choice of non-magnetic support, binder, solvent or method of application of the magnetic particles to the support will vary with the properties desired and the specific form of the magnetic recording medium being produced.

The following example illustrates the preparation of one form of a magnetic recording tape with the particles prepared as set forth in Example 1.

*Example 2*

A dispersion of the iron-cobalt-oxide particles of Example 1 was prepared from the following formulation:

| | Grams |
|---|---|
| Iron-cobalt-oxide particles | 100 |
| Wetting agent: lecithin (Yelkin TTS) | 5 |
| Binder: vinyl chloride-vinyl acetate copolymer | 12 |
| Plasticizer: dioctyl phthalate | 2 |
| Solvent: | |
| Toluene | 62 |
| Methyl isobutyl ketone | 62 |

The above materials were placed in a ceramic ball mill with 8 pounds of ⅜" diameter steel grinding balls and milled on a roller type mill for 240 hours. The milled dispersion contained 40 percent by volume iron-cobalt-oxide particles, remainder vehicle, excluding solvent. The resulting particles had an intrinsic coercive force of 575 and a *Br/Bis* ratio of .710, as measured in the dispersion at −196° C.

The dispersion was then coated onto a 1.5 mil film of cellulose acetate backing material with a doctor blade. The coated tape was then passed through a D.-C. orienting coil of 2000 gauss, dried and wound onto a reel.

Comparative tests were run on tapes made in accordance with the invention and on gamma iron oxide magnetic tapes of a type presently in widespread use. The test results showed that the tapes of the invention possessed over three times the remanent induction of gamma iron oxide tapes having comparable volume fractions of magnetic material. For equivalent thicknesses and volume fractions of magnetic material, tapes of this invention had over three times the remanent flux of the prior art tapes. This means that tapes of the invention yield three times the output of gamma iron oxide tapes of equivalent coating thickness. Conversely, tapes of the invention having coating thicknesses one-third that of gamma iron oxide tapes will achieve equivalent output signals. Moreover, the increased output is accomplished without a proportionate increase in the noise and thus the dynamic range (signal to noise ratios) is substantially increased.

What I claim as new and desire to secure by Letters Patent of the United States is:

1. A magnetic recording medium comprising a non-magnetic support and electrodeposited, fine magnetic particles supported thereon, each of the particles consisting essentially of a ferromagnetic core of an alloy of iron and cobalt and a ferrimagnetic coating surrounding said core of an oxide of iron and cobalt, the particles having from 10 to 80 percent cobalt based upon the combined weight of iron and cobalt and in excess of one percent oxygen based upon the total weight of the particles, the average diameter of said particles being less than 1000 angstroms.

2. A magnetic recording medium comprising a non-magnetic support and a magnetic coating adhered to said support, said magnetic coating containing electrodeposited fine magnetic particles, each of the particles consisting essentially of a ferromagnetic core of an alloy of iron and cobalt and a ferrimagnetic coating surrounding said core of an oxide of iron and cobalt, the particles having from 10 to 80 percent cobalt based upon the combined weight of iron and cobalt and in excess of one percent oxygen based upon the total weight of the particles, the average diameter of said particles being less than 1000 angstroms.

3. The magnetic recording medium of claim 2 in which the particles have an average diameter ranging from 200 to 700 angstroms.

4. The magnetic recording medium of claim 2 in which the particles are non-elongated.

5. A magnetic recording tape comprising a non-magnetic support and a magnetic coating adhered to said support, said magnetic coating comprising a binder and electrodeposited fine magnetic particles, each of the particles consisting essentially of a ferromagnetic core of an alloy of iron and cobalt and a ferrimagnetic coating surrounding said core of an oxide of iron and cobalt, the particles having from 10 to 80 percent cobalt based upon the combined weight of iron and cobalt and in excess of one percent oxygen based upon the total weight of the particles, the average diameter of said particles being less than 1000 angstroms.

6. A magnetic recording tape comprising a non-magnetic support and a magnetic coating adhered to said support, said magnetic coating comprising a binder and electrodeposited non-elongated fine magnetic particles, each of the particles consisting essentially of a ferromagnetic core of an alloy of iron and cobalt and a ferrimagnetic coating surrounding said core of an oxide of iron and cobalt, the particles having from 10 to 80 percent cobalt based upon the combined weight of iron and cobalt and in excess of one percent oxygen based upon the total weight of the particles, the average diameter of said particles ranging from 200 to 700 angstroms.

References Cited by the Examiner

UNITED STATES PATENTS

| | | | |
|---|---|---|---|
| 2,480,156 | 8/1949 | Matson et al. | 204—10 |
| 2,481,079 | 9/1949 | Casey | 204—10 |
| 2,941,901 | 6/1960 | Prill et al. | 117—76 |
| 2,974,104 | 3/1961 | Paine et al. | 204—10 XR |
| 2,988,466 | 6/1961 | Meiklejohn | 148—6.3 |

FOREIGN PATENTS

| | | |
|---|---|---|
| 761,451 | 11/1956 | Great Britain. |

WILLIAM D. MARTIN, *Primary Examiner.*

H. E. COLE, *Examiner.*

W. D. HERRICK, *Assistant Examiner.*